(12) United States Patent
Kalhan et al.

(10) Patent No.: US 9,591,461 B2
(45) Date of Patent: Mar. 7, 2017

(54) TRANSMISSION OF MBSFN SUBFRAME WITHIN A NON-LTE SERVICE AREA

(71) Applicant: Kyocera Corporation, Kyoto (JP)

(72) Inventors: Amit Kalhan, San Diego, CA (US);
Henry Chang, San Diego, CA (US);
David Comstock, San Diego, CA (US);
Douglas Dunn, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 121 days.

(21) Appl. No.: 14/048,399

(22) Filed: Oct. 8, 2013

(65) Prior Publication Data

US 2014/0098734 A1    Apr. 10, 2014

Related U.S. Application Data

(60) Provisional application No. 61/710,949, filed on Oct. 8, 2012.

(51) Int. Cl.
*H04W 4/00* (2009.01)
*H04W 4/06* (2009.01)

(52) U.S. Cl.
CPC ..................... *H04W 4/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 2009/0252077 | A1* | 10/2009 | Khandekar et al. | 370/312 |
| 2010/0322154 | A1* | 12/2010 | Chen et al. | 370/328 |
| 2012/0322447 | A1* | 12/2012 | Ramachandran et al. | 455/436 |
| 2013/0088983 | A1* | 4/2013 | Pragada et al. | 370/252 |

* cited by examiner

*Primary Examiner* — Frank Duong (57) ABSTRACT

A proxy multicast-broadcast single-frequency network (MBSFN) subframe conforming to a 3rd Generation Partnership Project (3GPP) Long Term Evolution (LTE) communication specification is transmitted within an MBSFN proxy region that at least partially overlaps with a non-LTE service area of a non-LTE access node providing wireless service to user equipment (UE) devices in the non-LTE service area. The non-LTE access node provides wireless service in accordance with a non-LTE communication specification that is different from the LTE communication specification. The MBSFN proxy region is smaller than, and is within an LTE service area of an LTE access node that provides wireless service to UE devices within the LTE service area in accordance with the LTE communication specification. The proxy MBSFN subframe is transmitted with a timing and frequency such that a UE device receiving service from the LTE access node is capable of receiving the MBSFN subframe.

19 Claims, 6 Drawing Sheets

TRANSMISSION OF MBSFN SUBFRAME WITHIN A NON-LTE SERVICE AREA

RELATED APPLICATIONS

The application claims the benefit of priority of U.S. Provisional Patent Application Ser. No. 61/710,949, entitled "MBSFN TRANSMISSIONS FROM A NON-LTE NODE", filed on Oct. 8, 2012, and incorporated by reference in its entirety, herein.

BACKGROUND

The invention relates in general to wireless communication systems and more specifically to transmission of multicast-broadcast single-frequency network (MBSFN) subframes within a non-LTE service area.

Wireless communication networks provide wireless communication services to mobile wireless communication devices through a plurality of base stations that have geographical service coverage areas often referred to as cells. A base station may have any of numerous sized and shaped cells where a terminology has developed to categorize the various cell sizes. Cells can be categorized as macrocells, microcells, picocells, and femtocells. Macrocells are typically deployed with wireless wide area networks (WWAN) and have sizes measured in miles. Microcells are typically implemented to cover a block. Picocells are generally considered to be smaller than microcells and may be implemented to cover a small number of suites or a portion of a building. Femtocells are the smallest of the four categories and are typically implemented as extensions to other networks to provide service to a single residence or other similar small area.

In some implementations, networks using different communication technologies may provide service within overlapping geographical service areas. Wireless local area networks (WLANs) and wireless wide area networks (WWANs) provide wireless communication services to portable devices where the WLANs typically provide services within geographical service areas that are smaller than the geographical areas serviced by WWANs. Examples of WWANs include systems that operate in accordance with 2.5G (such as cdma2000), 3G (such as UMTS, WiMax), and other types of technologies, where each base station of the WWAN is typically designed to cover a service area having a size measured in miles. The term WWAN is used primarily to distinguish this group of diverse technologies from WLANs that typically have smaller service areas on the order of 100 to 300 feet per base station. Base stations in WLANs are typically referred to as access points and access nodes. An access point may be connected to the Internet, intranet, or other network through wires or wirelessly through a WWAN. Examples of WLANs include systems using technologies such as Wi-Fi and other wireless protocols in accordance with IEEE 802.11 standards. WLANs typically provide higher bandwidth services than WWANs at the expense of non-ubiquitous coverage whereas WWANs provide increased coverage areas at the cost of bandwidth and/or capacity. In order to provide a wireless user with the increased overall performance and continuous connectivity, multi-mode and dual-mode portable communication devices have been developed allowing the communication device to access the particular type of network that provides the most desirable tradeoffs. A multi-mode wireless communication device includes the appropriate components and functionality for communicating within more than one network. For example, a dual-mode portable communication device can communicate within a WWAN and a WLAN.

In order to provide a wireless user with the increased overall performance and continuous connectivity, many wireless communication devices can access more than one type of network. The device may access a particular type of network that provides the most desirable features and/or performance. Multimode wireless communication devices that can access two or more networks operating with different technologies. For example, a dual-mode portable communication device can communicate within a WWAN and a WLAN.

Unfortunately, conventional techniques for managing the connection status between the portable communication device and networks are limited often requiring inefficient searching mechanisms executed by the portable communication device in order to establish service with a new network for performing a handoff or traffic steering between networks. For example, some conventional systems require the mobile communication device to periodically tune to an alternate network channel in an attempt to detect an alternate network or alternate size cell resulting in significant power consumption with a limited success rate of detecting alternate networks or base stations.

SUMMARY

A proxy multicast-broadcast single-frequency network (MBSFN) subframe conforming to a 3rd Generation Partnership Project (3GPP) Long Term Evolution (LTE) communication specification is transmitted within an MBSFN proxy region that at least partially overlaps with a non-LTE service area of a non-LTE access node providing wireless service to user equipment (UE) devices in the non-LTE service area. The non-LTE access node provides wireless service in accordance with a non-LTE communication specification that is different from the LTE communication specification. The MBSFN proxy region is smaller than, and is within an LTE service area of an LTE access node that provides wireless service to UE devices within the LTE service area in accordance with the LTE communication specification. The proxy MBSFN subframe is transmitted with a timing and frequency such that a UE device receiving service from the LTE access node is capable of receiving the MBSFN subframe.

DETAILED DESCRIPTION

Figure 1:
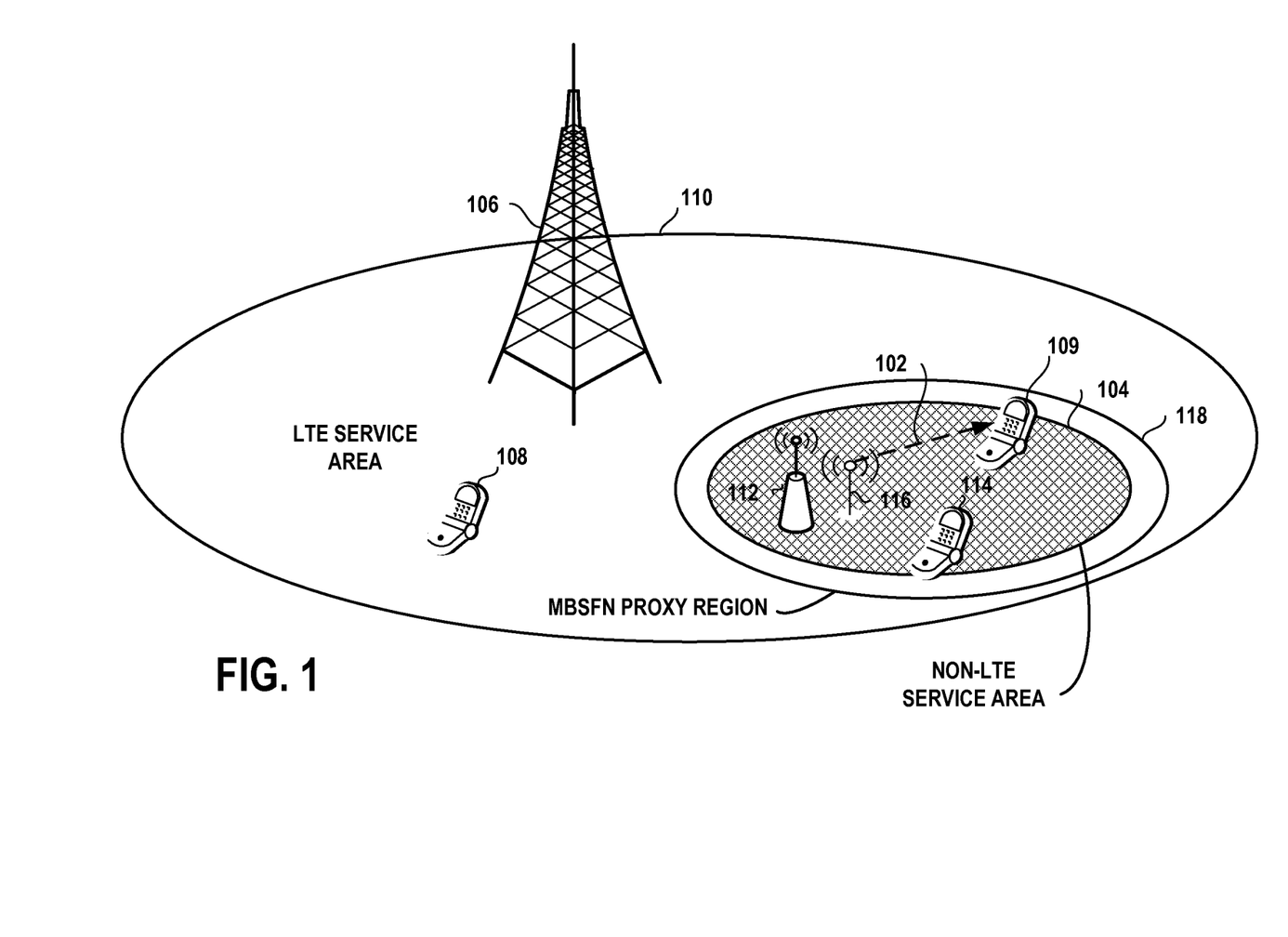
FIG. 1 is an illustration of a communication system where an MBSFN subframe is transmitted within a non-LTE service area.

FIG. 1 is an illustration of a communication system 100 where an MBSFN subframe 102 is transmitted within a non-LTE service area 104. An LTE access node 106 provides wireless communication service to user equipment devices (UEs) 108, 109 in an LTE service area 110 in accordance with a 3GPP LTE communication specification. A non-LTE access node 112 provides wireless communication service to UEs 114 within the non-LTE service area 104 in accordance with a communication specification that is different from the 3GPP LTE communication specification and that is not a 3GPP LTE specification. The non-LTE service area 104 is smaller than the LTE service area 110 and at least partially overlaps the LTE service area 110. For the example of FIG. 1, the non-LTE service area 104 is completely within the LTE service area 110.

The LTE access node 106 includes a wireless transceiver that exchanges wireless signals with the wireless communication devices (UEs) 108, 109 and the non-LTE access node 112 includes a transceiver that exchanges wireless signals with the wireless communication devices (UEs) 114. Transmissions from the access nodes and from the wireless communication devices (UEs) are governed by communication specifications that define signaling, protocols, and parameters of the transmissions. The communication specifications may provide strict rules for communication and may also provide general requirements where specific implementations may vary while still adhering to the communication specification. For the examples herein, LTE access node operates in accordance with the 3GPP Long Term Evolution (LTE) communication specification and the non-LTE access node operates in accordance with a different, non-LTE communication specification such as, for example, an IEEE 802.11x WiFi communication specification (where x may be a, b, g, n, ac, etc.). The communication specifications define at least a data channels and a control channels for uplink and downlink transmissions and specify at least some timing and frequency parameters for physical channels. Although in some situations a particular UE may only support communication in accordance with one of the specifications, the UEs discussed in the examples herein support both communication specifications and therefore are capable of communicating with either one of the access nodes.

The various functions and operations of the blocks described with reference to the communication system 100 may be implemented in any number of devices, circuits, and/or elements as well as with various forms of executable code such as software and firmware. Two or more of the functional blocks in the figures may be integrated in a single device and the functions described as performed in any single device may be implemented over several devices.

The LTE access node 106 is any transceiver station, access node, or base station operating in accordance with the LTE specification. Such equipment is typically referred to as an eNodeB or eNB in LTE terminology. Although the LTE service area may be any size cell such as femtocell, microcell, or macrocell, typical implementation of the examples herein include LTE service areas that are part of a Wireless Wide Area Network (WWAN) where the LTE service areas are macrocells. In most circumstances, several LTE access nodes are connected to a network controller (not shown) through network infrastructure to provide wireless communication services to multiple wireless communication devices over a wide geographic region.

The non-LTE access node 112 is any transceiver station, access node, or base station that provides wireless communication to UEs in accordance with a communication specification that is not an LTE communication. The non-LTE access node may be referred to as a base station, access node, transceiver station, and other names. For the examples herein, the non-LTE access node provides a Wireless Local Area Network (WLAN) and, therefore, can be referred to as a WLAN access point. In addition LTE networks typically use licensed frequency bands and non-LTE networks, such as WLAN, use unlicensed frequency bands For the examples herein, therefore, a non-LTE node (WLAN) is allowed to transmit in licensed band with LTE MBSFN transmit format.

The UEs may be referred to as mobile devices, wireless devices, wireless communication devices, mobile wireless devices, user equipment (UE), UE devices, as well as by other terms. The UEs 108, 109, 114 include electronics and code for communicating with the access nodes 106, 112 and may be devices such as cell phones, personal digital assistants (PDAs), wireless modem cards, wireless modems, and laptop computers, as well as other devices.

An antenna 116 near the non-LTE access node 112 transmits, within a MBSFN proxy region 118, an MBSFN subframe 102 that can be received by UEs 109 receiving service from the LTE access node and within the MBSFN proxy region 118. Accordingly, the MBSFN subframe 102 is transmitted with a frequency and timing that is compliant with the transmissions from the LTE access node 106. Although the MBSFN proxy region 118 is at least approximately the same shape and size as the non-LTE service area, the two areas are not identical in most situations due to different signal propagation. For example, the different frequency of the signals may result in different signal scattering and pathloss. Further, the shapes of the MBSFN proxy region and the non-LTE service area are shown as ovals (circular) in FIG. 1 for illustrative purposes. The actual shapes of these regions in most situations will be more irregular than shown in the figure. In some situations, the portions of the MBSFN proxy region may extend past the perimeter of the non-LTE service region. For the examples discussed herein, the MBSFN proxy region is slightly larger than the non-LTE service region. Such an arrangement allows for an access network selection procedure to begin as soon as the UE reaches the non-LTE service area boundary. The proxy region can be varied by adjusting the transmission power of the MBSFN subframe.

As is known, Multimedia Broadcast Multicast Service (MBMS) is a Point-to-Multipoint (PTM) interface specification designed to provide efficient delivery of broadcast and multicast services within 3GPP cellular networks. Examples of MBMS interface specifications include those described in Universal Mobile Telecommunications System (UMTS) and Long-Term Evolution (LTE) communication specifications. For broadcast transmission across multiple cells, the specifications define transmission over singlefrequency network configurations. Intended applications include mobile TV, news, radio broadcasting, file delivery, emergency alerts, and others. When services are broadcasted by MBMS, all cells inside an MBSFN (Multicast Broadcast Single Frequency Network) area normally transmit the same MBMS service and data. For the examples herein, however, the MBSFN subframe 102 transmitted within the MBSFN proxy region is not the same as other MBSFN subframes transmitted outside of the MBSFN proxy region.

The MBSFN subframe signal may be generated by equipment within or connected to the non-LTE access node 112 or may be generated by other remotely located equipment. As discussed below, for example, the antenna 116 may be connected to an LTE module that is part of or connected to the non-LTE access node where the LTE module is connected to the LTE access node through a backhaul connection such as an X2 link. In one example, the non-LTE access node is collocated with a small cell LTE access node, such as a picocell or a femtocell LTE access node, and receives MBSFN transmission and resource information over a communication link from the small cell LTE access node. In some situations, the non-LTE access node obtains MBSFN transmission and resource information, as well as timing information for synchronization, by wirelessly receiving signals from the LTE access node. In another example discussed below, the antenna is connected to the LTE access node but is collocated with the non-LTE access node.

The MBSFN subframe is receivable by UEs within the MBSFN proxy region where the UEs typically are receiving wireless service from the LTE access node or that are capable of receiving service from the LTE access node. Various types of information may be included in the MBSFN subframe 102. For example, the MBSFN subframe 102 may simply include information advertising the presence of the non-LTE access node. In other situations, the MBSFN subframe 102 may include information about the non-LTE access node 112 or the service provided such as, for example, a service set identifier (SSID), basic service set identification (BSSID), transmission power, and carrier frequencies. The information in the MBSFN subframe 102 can facilitate inter-technology mobility between the LTE access node and the non-LTE access node. An example of other MBSFN information includes the BSS load (which is the load of the WLAN AP). Other useful information is obtained when the UE accesses the WLAN AP. UEs that can operate on either the LTE network or the non-LTE network, and therefore engage in access network selection and mobility between the two networks, are often referred to as dual mode UEs or multi-mode UEs.

In some situations, the MBSFN subframe can include announcement information such as information related to public announcements, emergency alerts, and commercial advertisements. One advantage of such a technique for providing the announcement information is that the information is broadcast in the confined region of the MBSFN proxy region. For example, commercial advertisements for local shops located within or near the MBSFN proxy regions are not broadcast within the entire LTE service region. As a result, UEs located relatively far from the MBSFN proxy region do not receive the advertisements that would not be particularly useful to the users.

Figure 2:
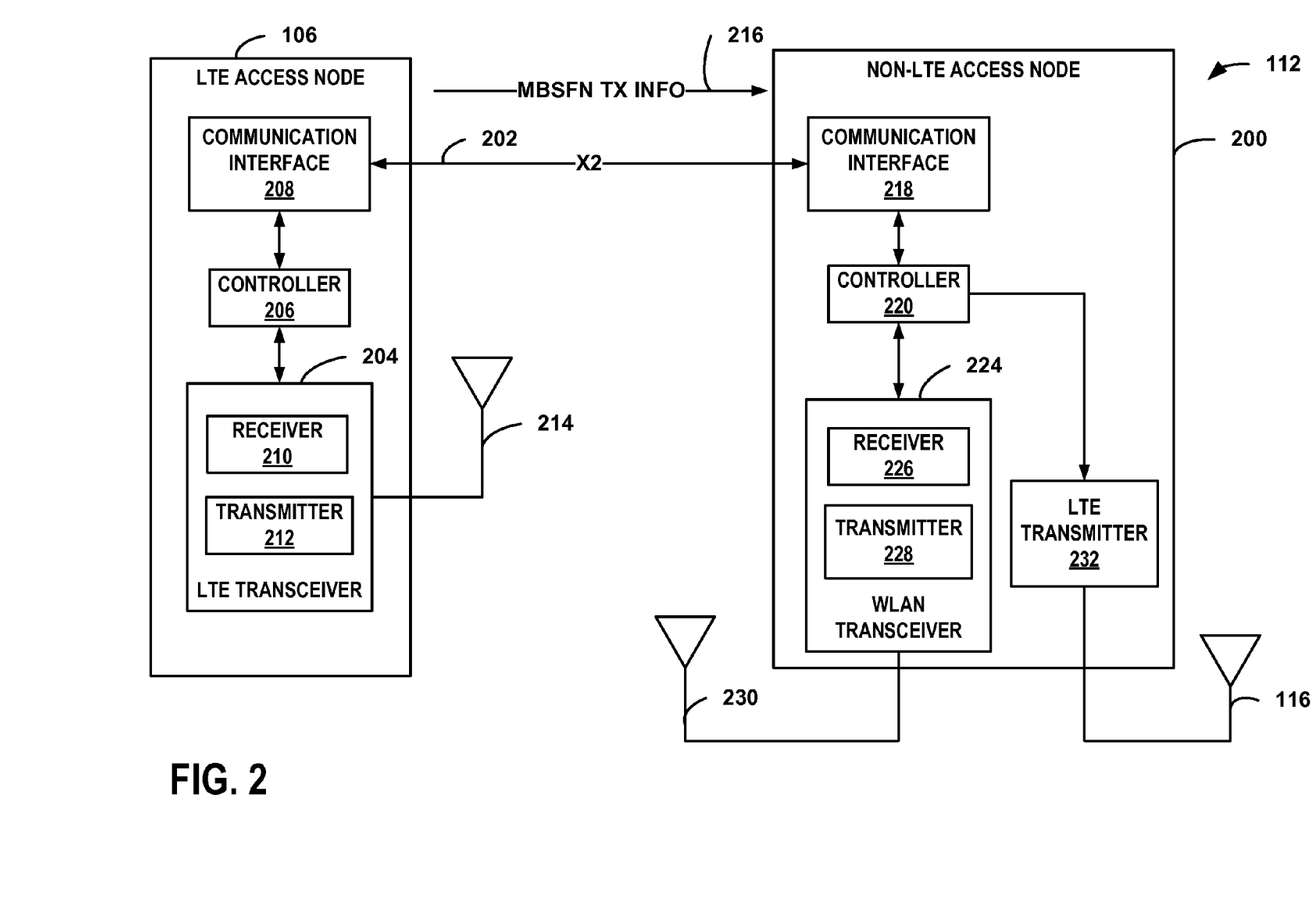
FIG. 2 is a block diagram of the LTE access node and the non-LTE access node in an example where the non-LTE access node is WLAN access point is connected to the LTE access node through an X2 communication link.

FIG. 2 is a block diagram of the LTE access node 106 and the non-LTE access node 112 in an example where the non-LTE access node 112 is WLAN access point 200 is connected to the LTE access node 106 through an X2 communication link 202. The various functions and operations of the blocks described with reference FIG. 2 may be implemented in any number of devices, circuits, and/or elements as well as with various forms of executable code such as software and firmware. Two or more of the functional blocks of FIG. 2 may be integrated in a single device and the functions described as performed in any single device may be implemented over several devices. For example, at least portions of the functions of the transceivers may be performed by the controllers.

The LTE access node 106 includes at least an LTE transceiver 204, a controller 206 and a communication interface 208. The LTE transceiver 204 includes an LTE receiver 210 and an LTE transmitter 212 configured to receive LTE uplink signals and transmit LTE downlink signals, respectively, through an antenna 214. The antenna 214 may include multiple antennas, multiple elements, and/or sectors. The controller 206 is any controller, processor, processing circuit, or processor arrangement that manages the functions described herein as well as facilitating the overall functionality of the LTE access node. The LTE transmitter 212 and LTE receiver 210 operate in accordance with LTE communication specification to provide wireless service to UEs within the LTE service area.

The communication interface 208 facilitates communication over the X2 link. As is known, the X2 Application Protocol (X2AP) is conventionally used to coordinate handovers and perform load management between eNodeB network elements. The communication interface 208 communicates over the X2 link using the protocols defined in 3GPP LTE communication specification. For the example of FIG. 2, the LTE access node 106 provides the non-LTE access node 112 with MBSFN transmission information 216 that allows the non-LTE access node to create and transmit MBSFN subframes at the appropriate timing and within subframes that are not being used by the LTE access node 106.

The non-LTE access node 112 (WLAN access point 200) includes a communication interface 218, a controller 220, a WLAN transceiver 222 and an LTE transmitter 224. The communication interface 218 facilitates communication with the LTE access node 106 over the X2 link 202. The WLAN transceiver 222 includes an LTE receiver 226 and an LTE transmitter 228 configured to receive WLAN uplink signals and transmit WLAN downlink signals, respectively, through an antenna 230. The antenna 230 may include multiple antennas, multiple elements, and/or sectors. The controller 220 is any controller, processor, processing circuit, or processor arrangement that manages the functions described herein as well as facilitating the overall functionality of the non-LTE access node. The WLAN transmitter and WLAN receiver operate in accordance with a non-LTE communication specification to provide wireless service to UEs within the non-LTE service area. For the example, the WLAN transceiver operates in accordance with an IEEE 802.11x communication specification although other communication specifications may be used.

The controller 220 determines the appropriate parameters for MBSFN subframes and generates the MBSFN subframe. As mentioned above, the LTE access node provides the MBSFN transmission information over the X2 link for the example of FIG. 2. The MBSFN transmission information includes timing information for synchronization as well as information regarding what MBSFN subframes are available for the non-LTE access node to use. Examples of other information include transmit power level, modulation order/coding and MIMO parameters. An LTE transmitter 232 transmits the MBSFN subframe in accordance with the LTE communication specification through the antenna 116.

Although the functionality of the MBSFN transmission is shown as implemented within the non-LTE access node, some or all of the MBMSF functions may be implemented in a separate device. For example, the communication interface, a controller, and the LTE transmitter can be implemented in a standalone device that communicates with the non-LTE access node. Accordingly, MBSFN information for transmission in the MBSFN subframe can be provided by the non-LTE access node to the standalone device which then creates and transmits the MBSFN subframes.

Figure 3:
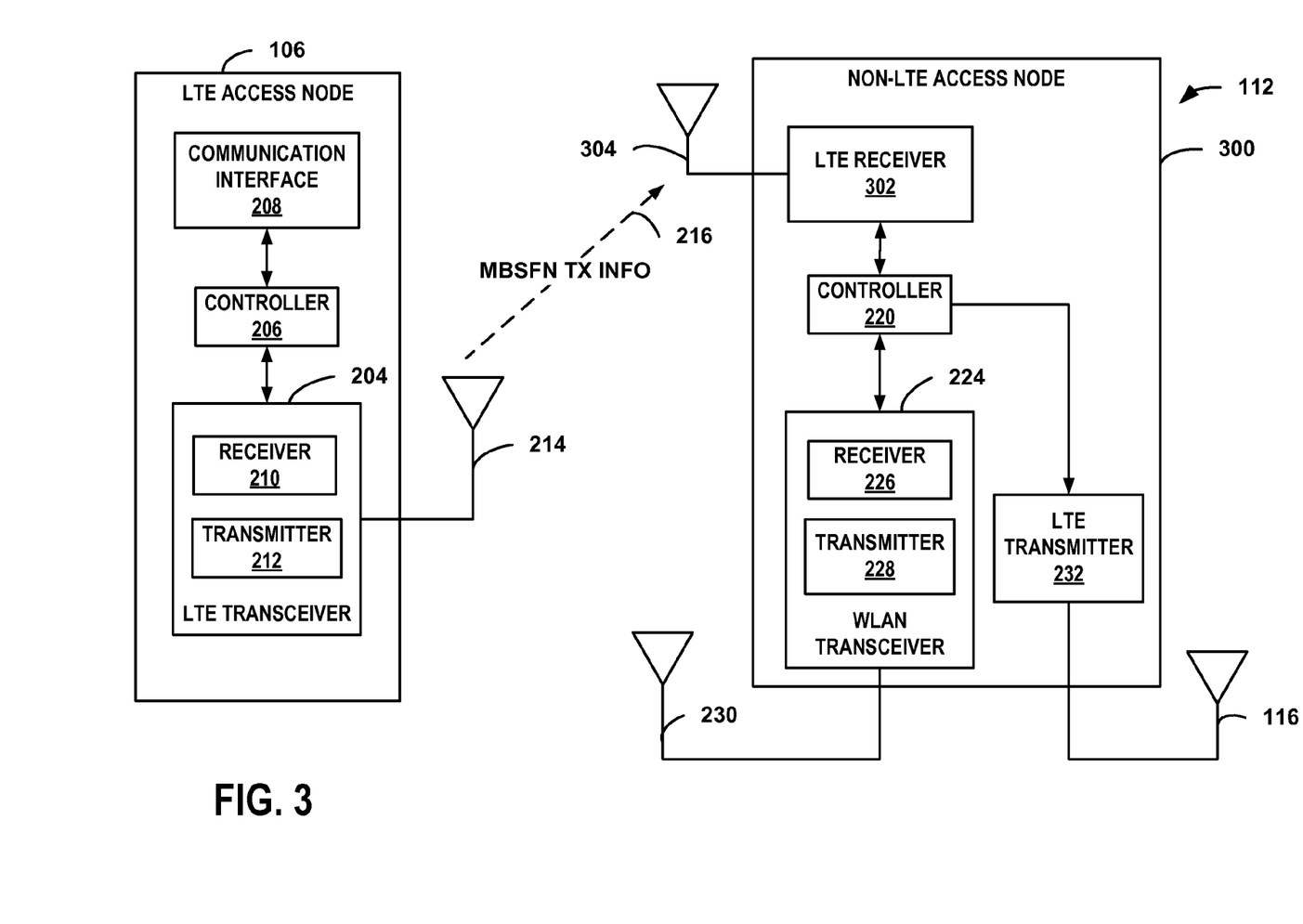
FIG. 3 is a block diagram of the LTE access node and the non-LTE access node in an example where the non-LTE access node is a WLAN access point that includes a LTE receiver for receiving the MBSFN transmission information 216 from the LTE access node.

FIG. 3 is a block diagram of the LTE access node 106 and the non-LTE access node 112 in an example where the non-LTE access node 112 is a WLAN access point 300 that includes a LTE receiver 302 for receiving the MBSFN transmission information 216 from the LTE access node 106. The non-LTE access node (WLAN access point 300) operates as discussed above with reference to FIG. 2 except that two access nodes are not connected through an X2 communication link and the MBSFN transmission information is received wirelessly through the LTE receiver 302.

The LTE receiver receives LTE downlink signals transmitted by the LTE access node through an antenna 304. In some situations, the receiver antenna 304 is the same as the transmission antenna 116 used for transmitting the MBSFN subframes. Therefore, for the example of FIG. 3, the non-LTE access node receives LTE downlink signals and determines the appropriate parameters for transmitting MBSFN subframes. The LTE downlink signal also allows the WLAN AP 300 to synchronize with the LTE access node 106. LTE control signals identify the subframes reserved for MBSFN. The information may be broadcasted in system information blocks (SIB) and/or transmitted using downlink control channels. For example, in 3GPP LTE TS 36.331, a SIB2 includes the information element, mbsfn-SubframeConfig-List, that defines the subframes reserved for MBSFN for the downlink. This information is also provided in the PDCSCH-ConfigInformation element. Therefore, for the example of FIG. 3, the WLAN AP 300 reads the SIB2 and determines which subframes are reserved for MBSFN. In addition, the WLAN AP reads the SIB13 to determine which subframes are scheduled for MBMS so that it does not use the MBSFN already allocated for MBMS. Based on the MBSFN transmission information, the non-LTE access node identifies subframes that can be used to transmit the MBSFN subframes with the MBSFN information from the LTE transmitter. In some circumstances, additional information in a current SIB or a new SIB may be included to indicating to the UEs that particular MBSFN subframes should be monitored for transmission from WLAN AP 300.

Figure 4:
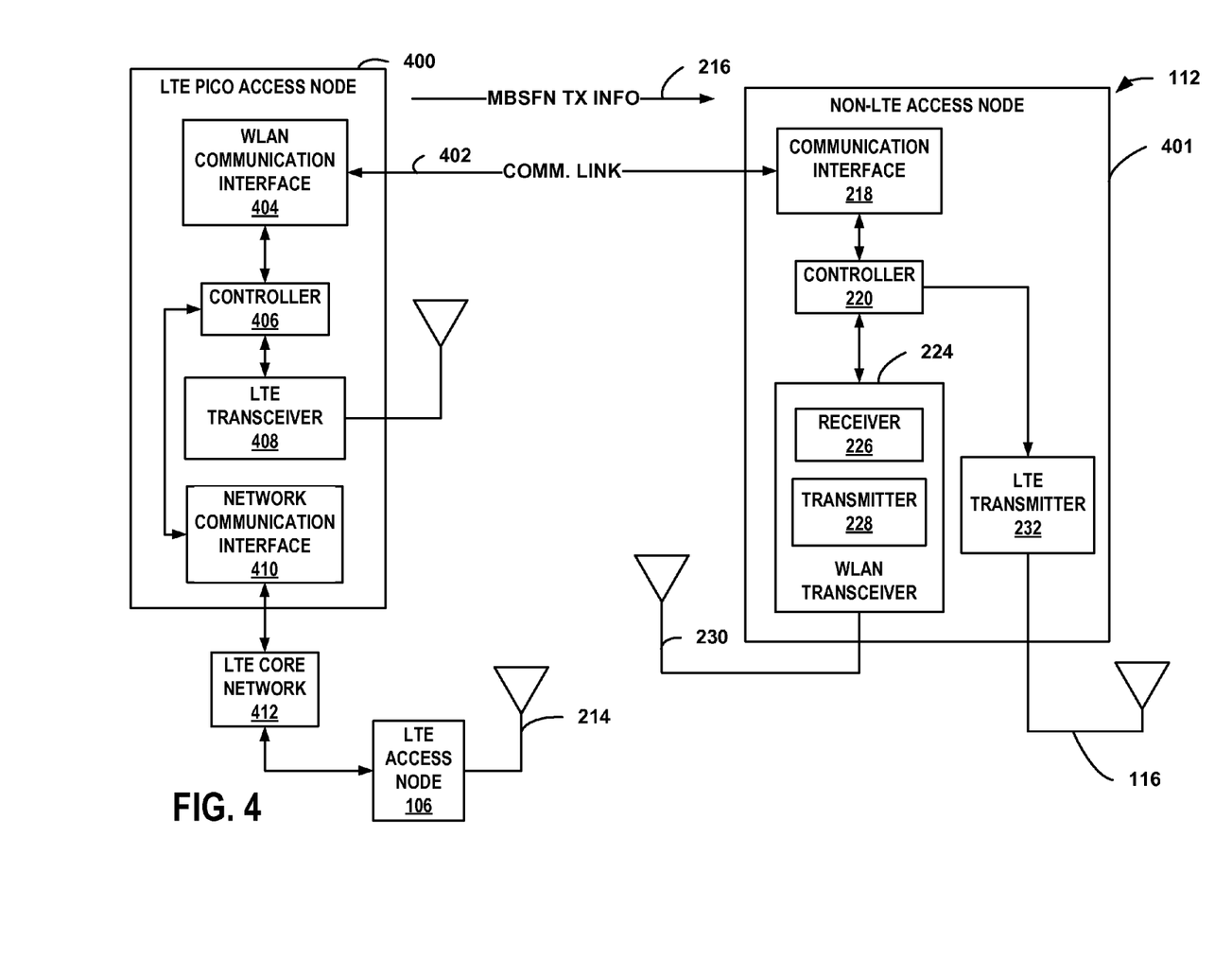
FIG. 4 is a block diagram of the LTE access node and the non-LTE access node in an example where the non-LTE access node is connected to a LTE pico access node through a communication link.

FIG. 4 is a block diagram of the LTE access node 106 and the non-LTE access node 112 in an example where the non-LTE access node 112 is connected to a LTE pico access node 400 through a communication link 402. The non-LTE access node 112 (401) operates as discussed above with reference to FIG. 2 except that the non-LTE access node 401 receives the MBSFN transmission information 216 over a proprietary communication link 402 from the collocated pico LTE access node 400 instead of from the LTE access node 106 over an X2 communication link. The example of FIG. 4 is most likely to be implemented in situations where the non-LTE access node 401 and the pico access node 400 are operated by the same operator.

For the example, the LTE pico access node 400 includes a WLAN communication interface 404, a controller 406, an LTE transceiver 408 and a network communication interface 410. The controller 406 is any controller, processor, processing circuit, or processor arrangement that manages the functions described herein as well as facilitating the overall functionality of the LTE pico access node 400. The LTE transceiver 408 operates in accordance with the LTE communication specification to provide wireless service to UEs within a pico LTE service area that at least partially overlaps with the non-LTE service area. The network communication interface 410 facilitates communication with the LTE core network 412 and/or other LTE access nodes such as the LTE access node 106. The WLAN communication interface 404 facilitates communication between the LTE pico access node 400 and the non-LTE access node 401. As mentioned above, a proprietary communication link 402 can be used between the nodes 400, 401 where the nodes are operated by the same operator. In some situations, a standard communication link can be used. Also, in some circumstances, the network communication interface 410 and the WLAN communication interface 404 may be implemented as a single communication interface. The non-LTE access node 401 is similar to the non-LTE access node of FIG. 2 except that the non-LTE access node 401 includes a communication interface 414 that communicates with the LTE pico access node over the communication link 402. The MBSFN transmission information 216 including timing for synchronization, identification of reserved MBSFN subframes and identification of scheduled MBSFN subframes is provided to the non-LTE access node 401.

Figure 5:
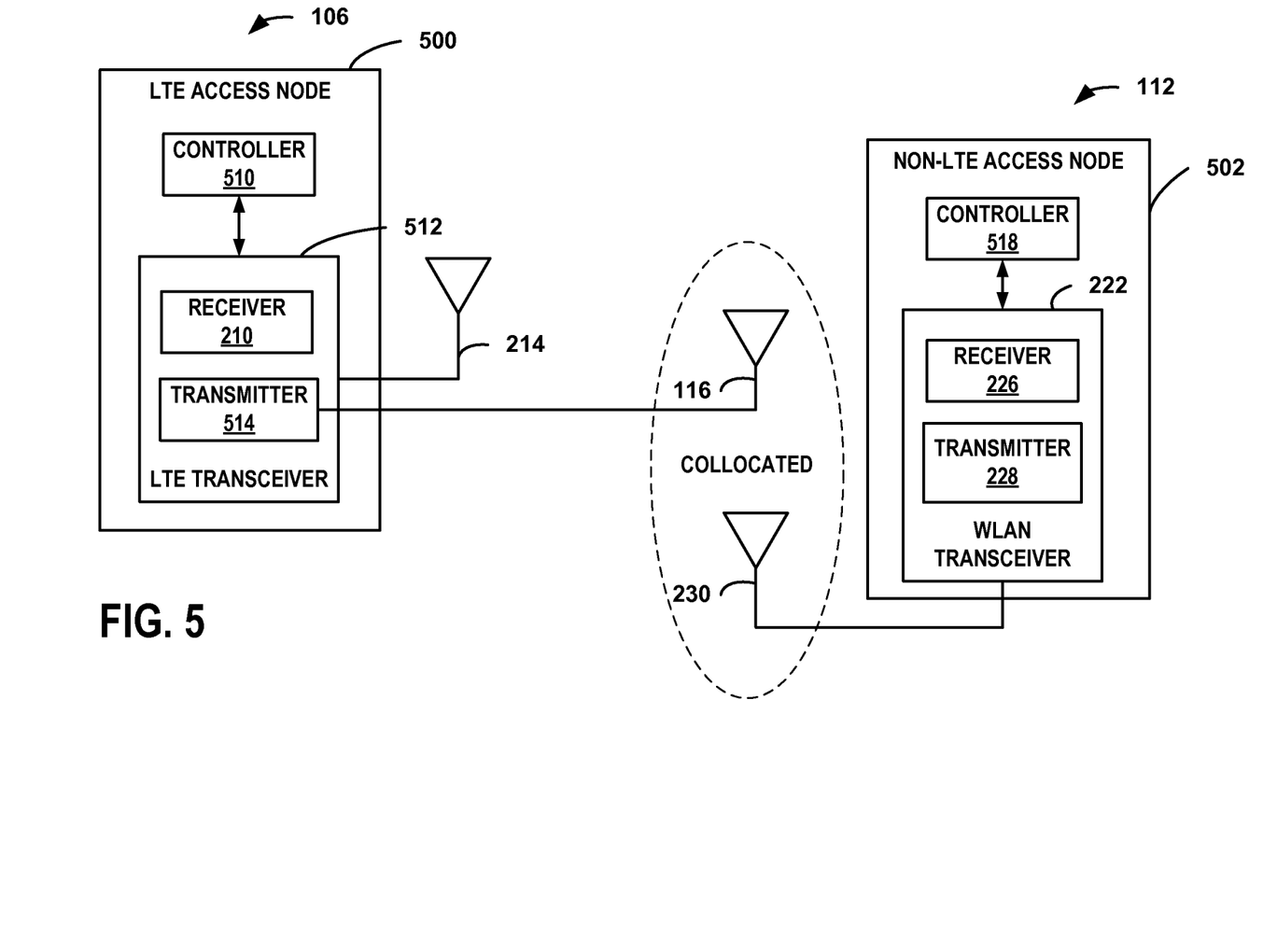
FIG. 5 is a block diagram of the LTE access node and the non-LTE access node in an example where the LTE access node transmits the MBSFN subframes through the antenna.

FIG. 5 is a block diagram of the LTE access node 106 and the non-LTE access node 112 in an example where the LTE access node 500 (106) transmits the MBSFN subframes 102 through the antenna 116. For the example of FIG. 5, there is no communication between the LTE access node 500 and the non-LTE access node 502. In some situations information may be transferred between the two nodes where the nodes are operated by the same operator and a communication link facilitates communication. The LTE access node 500 generates the MBSFN subframe 102 and transmits the MBSFN subframe 102 within the MBSFN proxy region through the antenna 116.

The controller 510 and LTE transceiver 512 operate similarly to the controller 206 and LTE transceiver 204 of FIG. 2 except that the LTE transmitter 514 in the LTE transceiver 512 is also connected to the antenna 116 and the LTE access node 500 transmits the MBSFN subframe 102.

The non-LTE access node 112 (WLAN access point 502) includes a controller 518, and a WLAN transceiver 222. The WLAN transceiver 222 includes a WLAN receiver 226 and a WLAN transmitter 228 configured to receive WLAN uplink signals and transmit WLAN downlink signals, respectively, through an antenna 230. The controller 518 is any controller, processor, processing circuit, or processor arrangement that manages the functions described herein as well as facilitating the overall functionality of the WLAN access point 502. The controller 518 determines the MBSFN information 504 that should be transmitted in the MBSFN subframes and forward the MBSFN information 504 through the communication interface 516 to the LTE access node 500.

As discussed above, the MBSFN subframe 102 may include MBSFN information useful for different purposes. In some examples, the MBSFN subframe can assist in access network section and increase efficiency in the system. Even where the MBSFN subframe 102 only notifies UEs of the existence of the non-LTE access node, for example, the use of battery power at the UEs is decreased since the UEs do not need to tune to different frequencies in order to search for non-LTE access nodes. For the example of FIG. 5, the MBSFN subframe at least indicates the existence of the non-LTE access node (WLAN AP). In some situations, such as where the two nodes are operated by the same operator, the MBSFN information may include additional information. Examples of other information include a frequency band of operation and a Service Set Identifier (SSID) of the WLAN AP.

Figure 6:
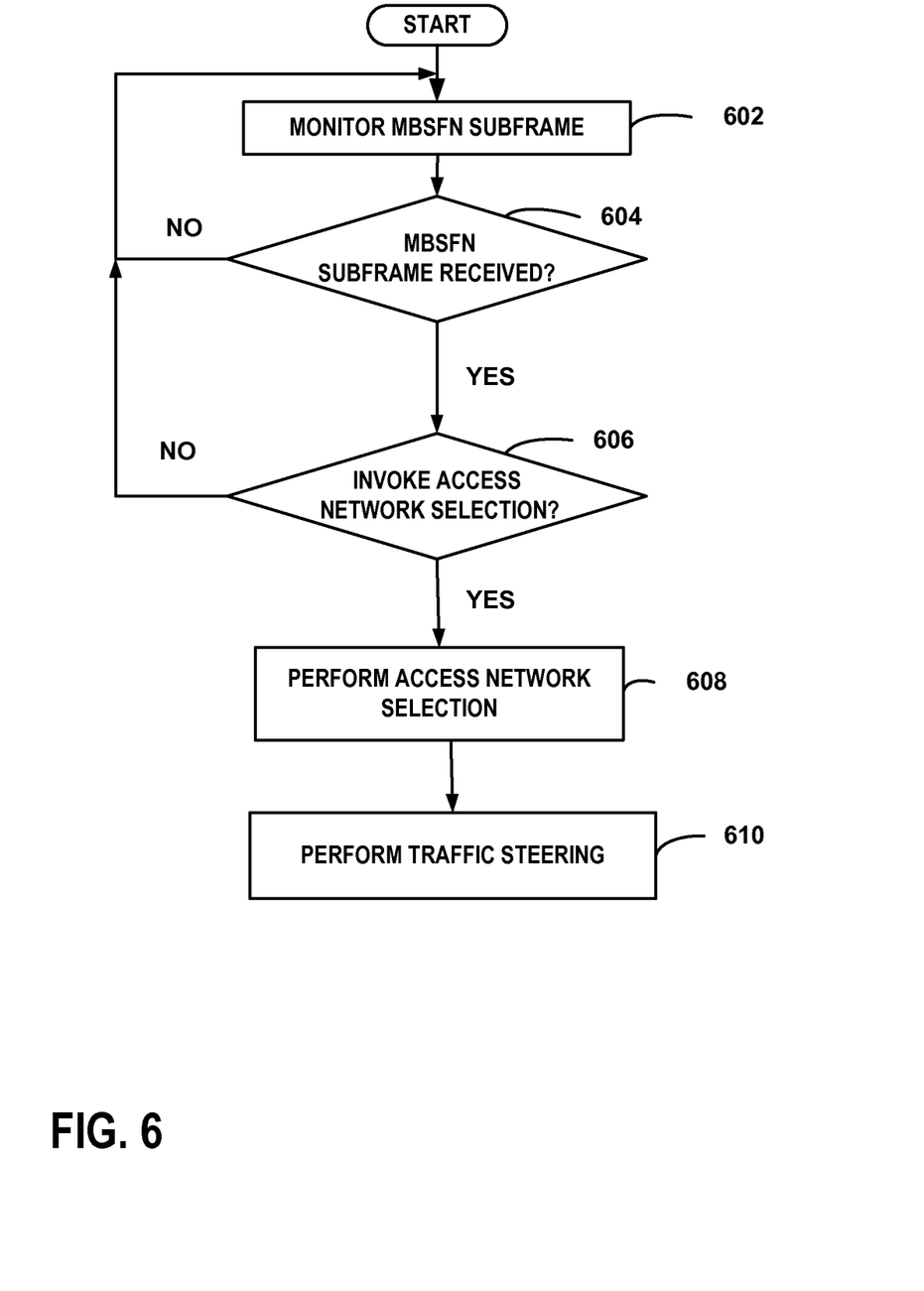
FIG. 6 is a flow chart of method of utilizing a MBSFN subframe received at a UE.

FIG. 6 is flow chart of method performed by a UE of utilizing the MBSFN subframe for access network selection and inter-technology mobility. As discussed herein, access network selection and inter-technology mobility refers to the processes of a UE establishing communication with the non-LTE access node while, or directly after, communicating with the LTE access node. Such a procedure includes detecting the non-LTE network, making a network selection, and engaging in traffic steering to direct data through the non-LTE network (WLAN). In some cases, communication may be maintained with the LTE access node while, in other situations, communication with the LTE node is terminated.

At step 602, the UE monitors the MBSFN subframe. Control information may be broadcast to the UE where the control information indicates to the UE which MBSFN subframe provides MBSFN information regarding non-LTE access nodes. The UE, therefore, receives and decodes the MBSFN subframe. In some situations, the UE may only monitor the MBSFN subframe when certain criteria are met. For example, the UE may not monitor the MBSFN subframe where acquiring service from the non-LTE node is not desired. The decision whether to monitor the MBSFN subframe may be based on UE criteria, network conditions, or on combination thereof. For one example, the LTE access node provides instructions to the UE indicating whether the UE should monitor the MBSFN subframe. As discussed below, this may be related to a broadcast message by the LTE access node notifying all UEs to search for alternate networks. The UE may not need to monitor the MBSFN subframe unless the LTE access node has instructed the UE to search for other access nodes.

At step 604, the UE determines if an MBSFN subframe transmitted from the antenna 116 has been received. Accordingly, the UE continues to monitor the MBSFN subframe to search for the signal transmitted by the antenna 116. When the MBSFN subframe 102 is received, the procedure continues at step 606. Otherwise, the method returns to step 602

At step 606, it is determined whether a network selection procedure should be invoked. The UE determines whether the UE should search for the non-LTE access node (WLAN AP). The decision may be based on various factors such as a type or QoS of service required, BSS loading of the WLAN AP, SSID of the WLAN AP, and instructions provided by the LTE access node. In one example, the UE does not search for WLAN APs unless instructed by the LTE network. Depending on the implementation, the UE may not even decode the MBSFN subframe unless instructed by the LTE access node. In some situations, however, the UE may decode MBSFN subframe and only search for the non-LTE access node if instructed to do so. In other situations, the UE may extract the MBSFN information from the MBSFN subframe and determine whether to search for the WLAN access point at least partly based on the MBSFN information. For example, where the MBSFN information includes the SSID, the UE may be instructed (or preprogrammed) to only search for the WLAN AP if the SSID indicates it is an authorized operator. In other cases, the ANDSF (Access Network Discovery and Selection Function) may be available to the UE. ANDSF is used to provide the UE with two sets of information, Access Network Discovery and Inter System Mobility Policies. ANDSF would also include information on whether an WLAN AP is forbidden or not as well as prioritization among the valid WLAN APs The examples discussed above described only some of the situations and criteria that can be used to determine whether the UE should invoke the access network selection. Other conditions, information and combinations may be used. If it is determined that the access network selection should be invoked, the method continues at step 608. Otherwise, the method returns to step 602.

At step 608, access network selection is performed. The UE searches for the WLAN AP and determines if data should be offloaded to the WLAN AP. In some situations, the UE may determine that the WLAN AP should not he acquired based on new information determined during network selection. For example, signal quality may not be adequate. Another example of new information that may prohibit acquisition of the WLAN AP may include the SSID in situations where the SSID is not included in the MBSFN subframe 102 or the SSID is forbidden by the ANDSF. However, a user's preferred SSID such as an SSID belonging to user's home WLAN AP is typically not included in this restriction. After the WLAN AP is selected, the method continues at step 610.

At step 610, the UE is engaged in traffic steering. Therefore, the combination of steps 608 and 610 can be interpreted as LTE to non-LTE interworking. As is known, for example, 3GPP-WLAN Interworking extends 3GPP services and functionality to the WLAN access environment. The 3GPP-WLAN Interworking System provides bearer services allowing a 3GPP subscriber to use a WLAN to access 3GPP PS based services. The interworking typically requires the following functionalities:

Provide Access, Authentication and Authorisation (AAA) services to the 3GPP-WLAN Interworking System based on subscription.

Provide access to the locally connected IP network (e.g. the Internet) if allowed by subscription.

Provide WLAN UEs with IP bearer capability to the operator's network and PS Services, if allowed by subscription.

Provide WLAN UEs with IP bearer capability to access IMS Emergency calls for both UICC and UICC-less cases.

The traffic steering portion of the interworking involves data offloading from the LTE access node to the non-LTE access node that is typically based on a specific IP flow, data bearer or specific PDN (packet data node). Such offloading procedures can be done seamlessly or non-seamlessly, depending on whether IFOM (IP Flow Mobility and Seamless offload, MAPCON (Mutt-Access PDN Connectivity) or NSWO (Non-seamless WLAN offload) is supported by the particular implementation. As is known, with inter-system routing, IP traffic can be routed over multiple radio access interfaces. For example MAPCON provides PDN-level mobility, IFOM provides IP flow-level mobility and NSWO provides IP flow-level mobility, but has no service continuity (new IP address is allocated at the other access network).

Therefore, the MBSFN information provided in the MBSFN subframe 102 allows for more efficient inter-system (inter-technology) mobility although conventional techniques for offloading data to the new network can be used. The MBSFN subframe 102 provides information that at least indicates that a non-LTE access node exists in the area. The MBSFN information may also provide additional information that assists in network selection and acquisition of the non-LTE access node. Power consumption at the UEs can be significantly reduced by eliminating the need for UEs to periodically tune to non-LTE frequencies and search for signals. Further efficiencies are realized when an LTE access node exists but is not desired for service and the UE does not search for the non-LTE node because of information revealed by the information in the MBSFN subframe (e.g., SSID, BSS load, etc). Also, since the MBSFN subframe is transmitted in a localized area, the MBSFN subframe include local information of most interest to UEs in the area without broadcasting the information throughout the entire LTE service area. The MBSFN subframe may include commercial advertisements, emergency information and other location specific data.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method comprising:
   transmitting a multicast-broadcast single-frequency network (MBSFN) subframe in accordance with a Long Term Evolution (LTE) communication specification within an MBSFN proxy region at least partially overlapping with a non-LTE service area;
   the MBSFN proxy region being smaller than, and at least partially within, an LTE service area;
   a non-LTE access node providing wireless communication services within the non-LTE service area;
   the MBSFN subframe transmitted with a protocol and timing to allow reception by a wireless communication device receiving wireless signals from an LTE access node providing wireless service within the LTE service area in accordance with the LTE communication specification, the non-LTE access node providing wireless communication service in accordance with another communication specification different than the LTE communication specification.

2. The method of claim 1, wherein the MBSFN subframe comprises MBSFN information related to the non-LTE access node.

3. The method of claim 2, wherein the MBSFN information comprises identification information identifying the non-LTE access node.

4. The method of claim 2, wherein the MBSFN information comprises transmission information identifying a transmission power used by the non-LTE access node.

5. The method of claim 2, wherein the MBSFN information comprises transmission information identifying a transmission frequency used by the non-LTE access node.

6. The method of claim 2, wherein the MBSFN information comprises Basic Service Set (BSS) load information identifying the current load of the non-LTE access node.

7. The method of claim 2, wherein the MBSFN information allows a user equipment device (UE) to initiate network selection of the LTE access node to the non-LTE access node.

8. The method of claim 1, wherein the MBSFN subframe comprises UE-specific information related to a service provided by the non-LTE access node.

9. A system comprising:
   a Long Term Evolution (LTE) access node providing wireless service within an LTE service area in accordance with an LTE communication specification;
   a non-LTE access node providing wireless service within a non-LTE service area that at least partially overlaps the LTE service area, the non-LTE access node providing the wireless service in accordance with another communication specification different from the LTE communication specification; and
   an antenna configured to transmit a multicast-broadcast single-frequency network (MBSFN) subframe in accordance with the LTE communication specification within an MBSFN proxy region at least partially overlapping the non-LTE service area,
   the MBSFN proxy region being smaller than, and at least partially within, an LTE service area, the MBSFN subframe transmitted with a protocol and timing to allow reception by a wireless communication device receiving wireless signals from the LTE access node.

10. The system of claim 9, wherein the non-LTE access node comprises an LTE transmitter connected to the antenna and configured to transmit the MBSFN subframe.

11. The system of claim 10, wherein the non-LTE access node comprises a communication interface configured to receive MBSFN transmission information from the LTE access node, the MBSFN transmission information identifying at least one of a an LTE timing, reserved subframes reserved for MBSFN transmission, and scheduled MBSFN subframes scheduled for MBSFN transmission by the LTE access node.

12. The system of claim 10, wherein the non-LTE access node comprises an LTE receiver configured to receive MBSFN transmission information from the LTE access node, the MBSFN transmission information identifying at least one of an LTE timing, reserved subframes reserved for MBSFN transmission, and scheduled MBSFN subframes scheduled for MBSFN transmission by the LTE access node.

13. The system of claim 9, wherein the MBSFN subframe comprises MBSFN information related to the non-LTE access node.

14. The system of claim 13, wherein the MBSFN information comprises identification information identifying the non-LTE access node.

15. The system of claim 13, wherein the MBSFN information comprises transmission information identifying a transmission power used by the non-LTE access node.

16. The system of claim 13, wherein the MBSFN information comprises transmission information identifying a transmission frequency used by the non-LTE access node.

17. The system of claim 13 wherein the MBSFN information comprises Basic Service Set (BSS) load information identifying the current load of the non-LTE access node.

18. The system of claim 13, wherein the MBSFN information allows a user equipment device (UE) to initiate network selection of the LTE access node to the non-LTE access node.

19. The system of claim 9, wherein the MBSFN subframe comprises UE-specific information related to a service provided by the non-LTE access node.

* * * * *